CONTROL SYSTEM FOR SURFACE APPARATUS

Original Filed July 16, 1963 4 Sheets-Sheet 1

INVENTORS
Clifford G. Beattie and
Victor D. Gumbert.
BY John D. Mesaros
THEIR ATTORNEY

CONTROL SYSTEM FOR SURFACE APPARATUS

Original Filed July 16, 1963 4 Sheets-Sheet 2

INVENTORS
Clifford G. Beattie and
Victor D. Gumbert.
BY John T. Mesaros
THEIR ATTORNEY

CONTROL SYSTEM FOR SURFACE APPARATUS

Original Filed July 16, 1963 4 Sheets-Sheet 3

INVENTORS
Clifford G. Beattie and
Victor D. Gumbert.
BY John D. Mesaros
THEIR ATTORNEY

CONTROL SYSTEM FOR SURFACE APPARATUS

Original Filed July 16, 1963 4 Sheets-Sheet 4

INVENTORS
Clifford G. Beattie and
Victor D. Gumbert.
BY
John D. Mesaros
THEIR ATTORNEY United States Patent Office Re. 26,365
Reissued Mar. 12, 1968

26,365

CONTROL SYSTEM FOR SURFACE APPARATUS

Clifford G. Beattie, Natrona Heights, and Victor D. Gumbert, Springdale, Pa., assignors to Allegheny Ludlum Steel Corporation, Brackenridge, Pa., a corporation of Pennsylvania Original No. 3,149,439, dated Sept. 22, 1964, Ser. No. 295,425, July 16, 1963, which is a continuation-in-part of Ser. No. 191,997, May 2, 1962. Application for reissue May 9, 1966, Ser. No. 552,673
11 Claims. (Cl. 51—34)

Matter enclosed in heavy brackets [ ] appears in the original patent but forms no part of this reissue specification; matter printed in italics indicates the additions made by reissue.

*ABSTRACT OF THE DISCLOSURE*

*Workpiece surface apparatus for grinding the entire surface of the slab wherein the grinding means is adapted for movement in two directions, the movement thereof being controlled by a first and a second motor means, the first motor means controlling the grinding means along one dimension of the workpiece and the second motor means controlling the grinding means in a direction transverse to the first direction in increments until the entire surface is ground. Switch means are provided to be actuated at the desired limits of movement of the grinding means for controlling the distance of travel of the grinding means and additionally providing the incremental advances of the grinding means. Additional switch means are also provided for disabling the grinding apparatus where the entire surface has been ground.*

[This invention relates to a system for controlling equipment adapted to work upon or condition the surface of a workpiece, and more particularly to a system of the type described for controlling equipment adapted to remove the entire surface of a workpiece.]

This application is a continuation-in-part of copending application Ser. No. 191,997, filed May 2, 1962, now abandoned, and assigned to the assignee of the present application.

Although not limited thereto, the present invention is particularly usable with a grinder of the type adapted to remove the surface layer of stainless steel slabs or the like. The necessity for grinding becomes apparent when it is remembered that during hot rolling of the steel from the ingot to a semi-finished form, a scale is formed on the slab together with a variety of ingot defects and some defects arising during heating or rolling. If the scale and defects are not removed, they will be carried through to the finished form, resulting in an inferior product.

In the usual slab grinder, the slab to be ground is placed upon a stationary table, while the grinding wheel is motor driven and mounted on the forward end of a boom which is pivotally mounted on a carriage reciprocal on tracks extending adjacent the table and parallel to the long transverse dimension of the slab to be ground. In most cases, the boom extends perpendicular to the tracks and is mounted on guideways to permit it to reciprocate in a direction which is transverse to the direction of movement of the carriage (i.e., parallel to the short transverse dimension of the slab). The boom is reciprocated by fluid-operated cylinder and piston means, while the pressure on the grinding wheel is controlled by second cylinder and piston means having one end pivotally connected to the carriage and another end pivotally connected to the boom structure. The carriage is usually driven by hydraulic motor means operatively connected to the wheels which ride on the aforesaid tracks, although this may be varied to suit requirements.

In the grinding operation, the entire surface of the slab is usually removed. In the past, this has been accomplished by an operator who sits on the aforesaid carriage and, by means of control levers mounted on an operator's console, manually manipulates the carriage back and forth along its tracks and the boom back and forth across the short transverse dimension of the slab until the entire surface of that slab is ground. Although the manual control of a slab grinder of this type is satisfactory, it requires the constant attention of an operator, a task which is tedious and requires large amounts of labor. In a single steel plant, for example, there may be twenty or more such grinders, each requiring a separate operator.

As an overall object, the present invention provides means for automatically controlling surfacing equipment, in general, and a slab grinder of the type described above, in particular, whereby the entire surface of the slab or other workpiece will be ground or otherwise worked upon without the need for manual manipulation of control levers by an operator. Thus, the invention provides a means for relieving the operator of a tedious and time-consuming task and at the same time provides a means for obtaining a more uniformly ground surface.

In accordance with the invention, the aforesaid grinding wheel is caused to traverse the surface of the slab back and forth along its long transverse dimension with the grinding wheel being advanced along the short transverse dimension of the slab at the completion of each long transverse stroke of the wheel. In this manner, the entire surface of the slab is ground from one long transverse edge to the other, the apparatus being coordinated by electrical control means such that the carriage and boom will be automatically guided over the slab or other workpiece to grind the entire surface without the need for manual guidance by an operator.

Specifically, there are provided switch devices adapted to be actuated at the extreme limits of reciprocating movement of the carriage on its track, and circuit means including the switch devices for causing first motor means to reverse the direction of movement of the carriage along its tracks whenever an extreme limit of travel is reached while causing second motor means to advance the boom and the grinding wheel or other tool carried thereby in increments along the short transverse dimension whenever at least one of the switch devices is actuated. In this manner, the grinding wheel will be caused to sweep back and forth across the long transverse dimension of the slab and periodically advanced along the short transverse dimension until the entire surface is ground. Preferably, additional switch means are provided for disabling the grinding apparatus when the entire surface has been ground.

In one embodiment of the invention limit switches are used to control the extreme limits of travel of the surfacing tool such that it will reverse its direction of travel whenever it reaches an edge of the workpiece to produce a back-and-forth action from one edge to the other. An additional limit switch is employed to stop the operation after the entire workpiece has been surfaced. Such limit switches, however, require manual adjustment (i.e., a change in physical location) for each workpiece surfaced since the sizes of the workpieces and their positioning on the workpiece supporting table vary. This is a somewhat cumbersome and time-consuming task on the part of the operator since he must leave the operator's console and walk around the machine to position the limit switches. Therefore, in another embodiment of the invention, and in accordance with another object thereof, means are provided whereby the operator can adjust the limits of travel by means of controls located on the operator's control console and without leaving the control cab. As will be seen, such controls include magnetic amplifiers incorporated in bridge circuits such that the physical location of the grinding wheel can be matched by an appropriate adjustment of a potentiometer at the control console.

The above and other objects and features of the invention will become apparent from the following detailed description taken in connection with the accompanying drawings which form a part of this specification, and in which.

Figure 1:
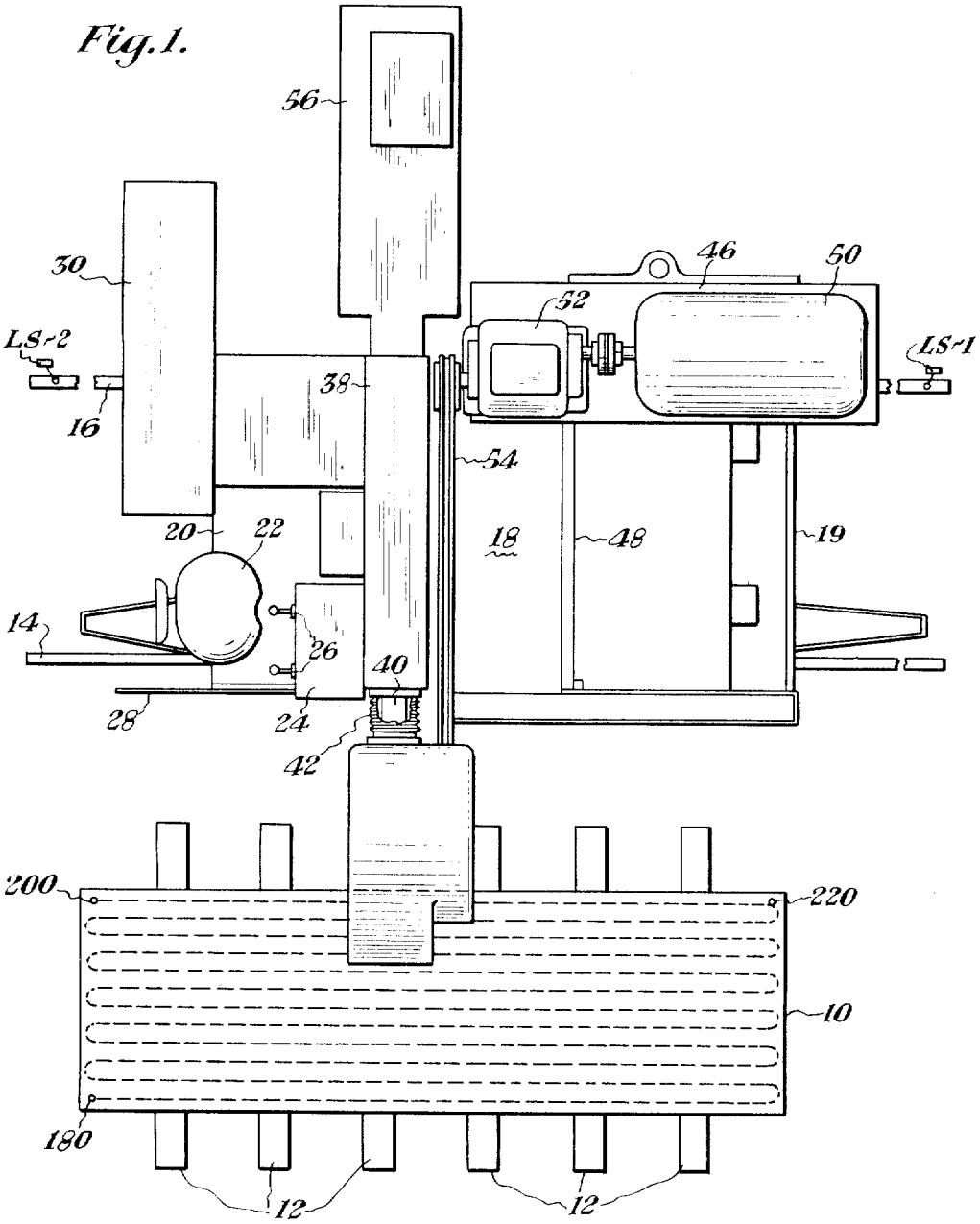
FIGURE 1 is a top view of a slab grinder of the type with which the present invention may be used.
Figure 2:
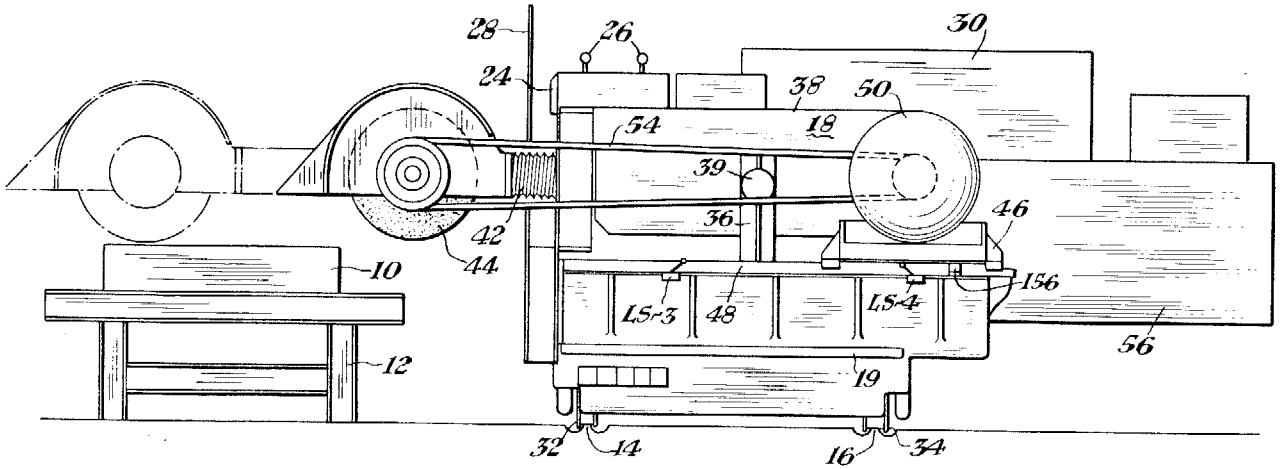
FIG. 2 is a side view of the slab grinder of FIG. 1.
Figure 3:
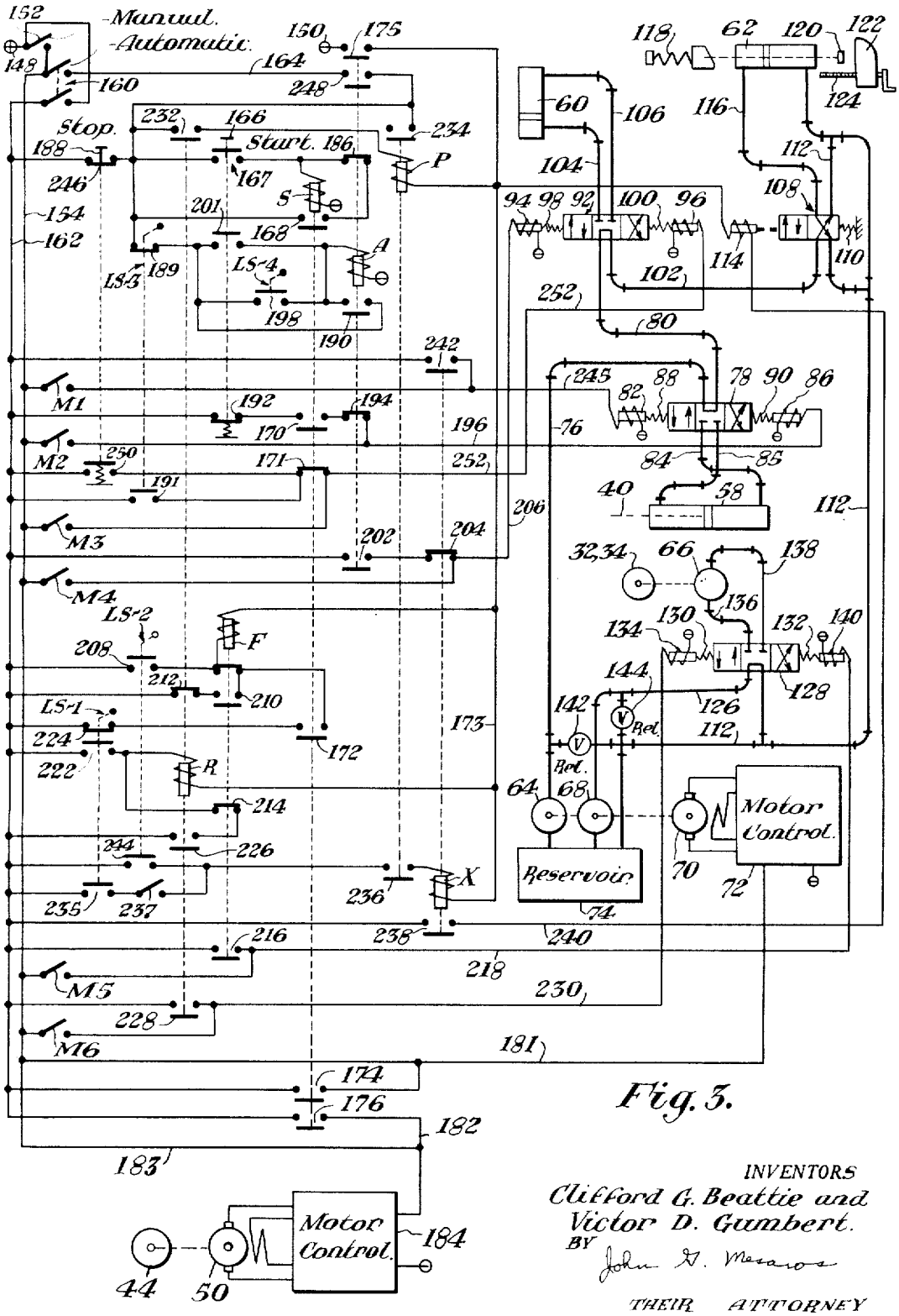
Figure 4:
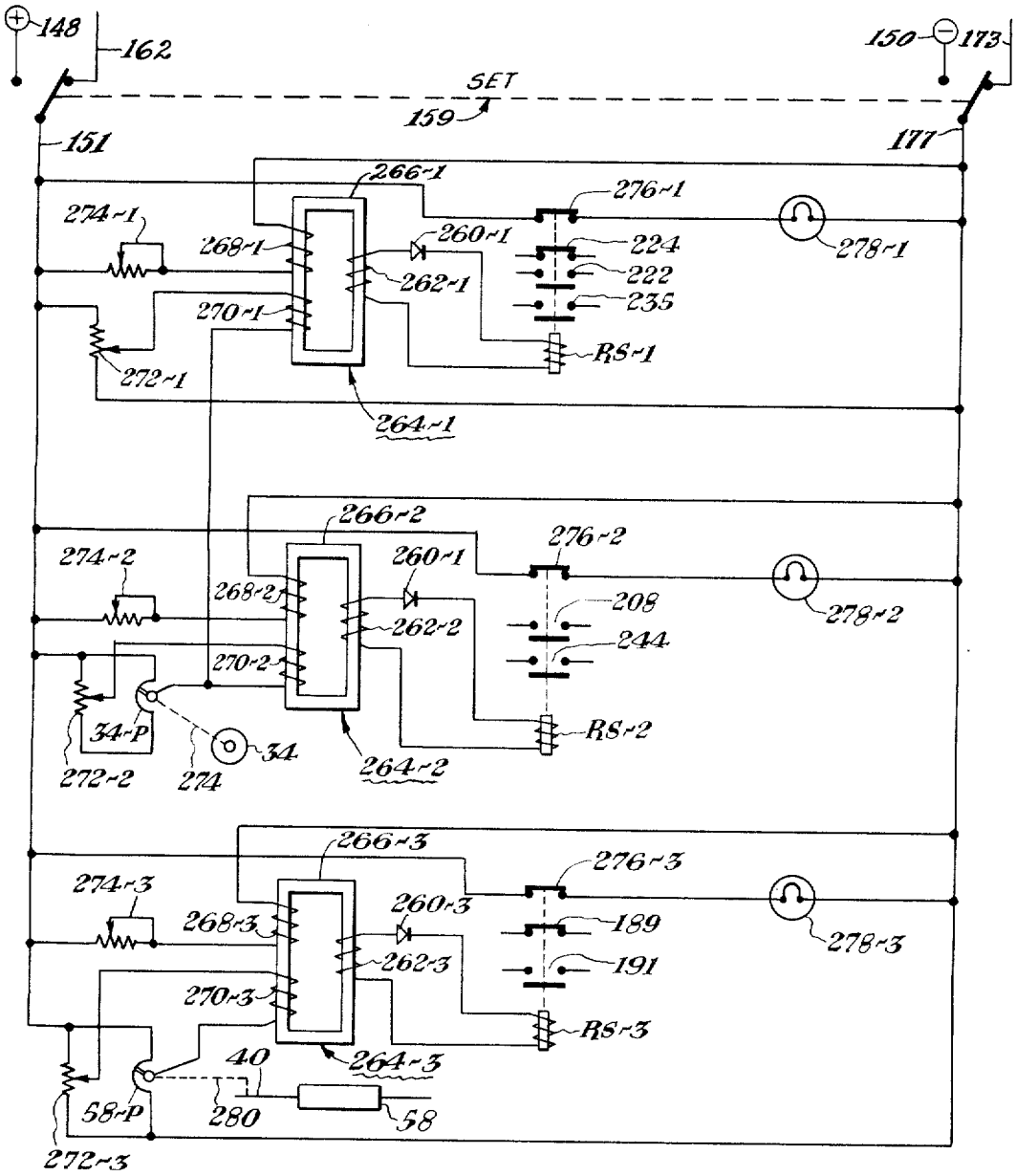

FIG. 3 comprises a schematic diagram of the hydraulic control system for the slab grinder of FIGS. 1 and 2 together with a schematic diagram of the electrical control system therefor; and FIG. 4 is a schematic circuit diagram of an alternative control system incorporating magnetic amplifiers.

Referring now to the drawings, and particularly to FIGS. 1 and 2, a slab 10 to be ground is positioned on a stationary support or a table comprising a series of spaced frame members 12. Adjacent the slab 10 and substantially parallel thereto are a pair of tracks 14 and 16 which carry, for reciprocating movement, the slab grinding apparatus generally indicated by the reference numeral 18. As shown, the grinding apparatus 18 comprises a carriage 19 having, at one end, an operator's platform 20 provided with a seat 22 (FIG. 1). Above the platform 20 is a control console 24 having levers 26 thereon for manually controlling the grinding apparatus in a manner hereinafter described. Extending upwardly on one side of the operator's platform 20 is a transparent shield 28 which protects the operator from small flying pieces of hot metal produced during the grinding operation. Adjacent the operator's platform 20, on the side oposite the shield 28, is a control box 30 which houses the electrical control apparatus for the grinder, hereinafter described.

As best shown in FIG. 2, the carriage 19 is mounted for reciprocating movement on tracks 14 and 16 by means of wheels 32 and 34. These wheels are driven by means of a reversible hydraulic motor, hereinafter described, to cause the carriage to move backwardly and forwardly along the tracks. Mounted on the carriage 19 is a trunnion 36 which carries a boom structure 38 for pivotal movement about an axis, generally indicated at 39 in FIG. 2. Boom structure 38 includes a reciprocable column 40 (FIG. 1) which is surrounded by a bellows arrangement 42 and which carries at its forward end a grinding wheel 44, the grinding wheel being adapted to rotate about an axis which extends generally parallel to the surface of the slab 10. Mounted adjacent the boom structure 38 is a platform 46 adapted to reciprocate on guideways 48 backwardly and forwardly together with the column 40 of the boom structure itself. Hydraulic cylinder and piston means, not shown in FIGS. 1 and 2, is provided for simultaneously reciprocating the column 40, the grinding wheel 44 carried thereby, and the platform 46 backwardly and forwardly, thereby causing the grinding wheel to traverse the slab 10 along a direction extending parallel to its short transverse dimension. Carried on the platform 46 is an electric motor 50 which is connected through a gear reducer 52 to a belt drive 54, this belt drive being adapted to rotate the grinding wheel 44. Carried on the rearward end of the boom structure 38 is a housing 56 which encloses a counterweight, not shown. As is well known to those skilled in the art, the counterweight is provided to maintain constant the downward force on the grinding wheel 44 regardless of how far it extends outwardly over the slab 10. The counterweight is actuated by the aforesaid hydraulic cylinder and piston apparatus which moves the platform 46 and the column 40, and is arranged such that when the grinding wheel 44 moves outwardly over the slab 10, the counterweight likewise moves outwardly in the opposite direction to produce the desired balancing effect. Also connected to the boom structure 38 is a second hydraulic cylinder and piston apparatus which serves to exert a downward force on the column 40 and the grinding wheel 44, this second hydraulic cylinder and piston apparatus being shown more in detail in FIG. 3.

Referring now to FIG. 3, the hydraulic piston and cylinder assembly for reciprocating the column 40, the grinding wheel 44 carried thereby and the platform 46 is indicated by the reference numeral 58; while the boom pressure cylinder and piston arrangement for exerting downward force on the grinding wheel is indicated by the reference numeral 60. Reference numeral 62 designates a metering cylinder which acts, in a manner hereinafter described, to cause the piston of cylinder 58 to advance the grinding wheel in increments.

The hydraulic pressure for cylinders 58, 60 and 62 is supplied by a first hydraulic pump 64; whereas the hydraulic pressure for a wheel-driving motor 66 for wheels 32, 34 is supplied by a means of a second hydraulic pump 68. Both of the pumps 64 and 68 are driven, as shown, by means of an electric motor 70 which is controlled through motor control circuit 72.

The pump 64, for example, has its input port connected to a reservoir 74 and its output port connected through conduit 76 to an inlet port of a spool valve 78. The valve 78 has three operative positions, and in the position shown, the conduit 76 will be connected to conduit 80. When, however, the spool valve is shifted to the right as shown in FIG. 3 by a solenoid 82, the conduit 76 will be connected to a conduit 84, thereby pressurizing the cylinder 58 to move its piston to the left. At the same time, the valve will connect the conduit 80 to conduit 85, this latter conduit being connected to the opposite end of the cylinder 58 to permit liquid to be discharged from the forward variable volume chamber of the cylinder. When the spool valve 78 is shifted to the left by solenoid 86, however, the conduit 76 will then be connected to the conduit 85; whereas the conduit 80 will be connected to conduit 84. Thus, the piston of cylinder 58 will now be caused to move to the right. When neither of the solenoids 82 or 86 is energized, the springs 88 and 90 will cause it to assume its central position wherein the conduit 76 is connected directly to conduit 80 while conduits 84 and 85 are blocked.

The conduit 80, in turn, is connected to a second spool valve 92 which, like valve 78, is controlled by two solenoids 94 and 96, the valve being centered by means of springs 98 and 100. With neither of the solenoids 94 nor 96 energized, and the valve centered, the conduit 80 will be connected directly to conduit 102. When, however, the solenoid 94 is energized, the spool valve 92 will shift to the right to connect conduit 80 to conduit 104, this conduit being connected to the lower end of the boom pressure cylinder 60. At the same time, when the spool valve 92 is shifted to the right by solenoid 94, the upper end of the boom cylinder 60 will be connected through conduit 106 to the conduit 102 to permit liquid to be discharged from the upper variable volume chamber of the cylinder. When solenoid 96 is energized, the situation is reversed. That is, the conduit 80 will now be connected through conduit 106 to the upper end of the boom pressure cylinder 60; whereas the lower end of the same cylinder will be connected through conduit 104 to conduit 102 to permit liquid to be discharged from the lower chamber of the cylinder.

It will be appreciated that the two cylinders 58 and 60 are connected in series, with any fluid entering the cylinders being delivered through conduit 76, and any fluid leaving the cylinders being delivered through conduit 102. Conduit 102, in turn, is connected to a two-position spool valve 108. As shown, the valve 108 is normally urged by a spring 110 to a position wherein the conduit 102 is connected to conduit 112, this latter conduit being connected to the reservoir 74. Conduit 112, it will be noted, is also connected to the right-hand chamber of the metering cylinder 62. When, however, the solenoid 114 is energized to shift the spool of the valve 108 to the right as viewed in FIG. 3, the conduit 102 will then be connected to the conduit 116, thereby pressurizing the left end of the cylinder 62. The piston of cylinder 62, it will be noted, is normally urged by a spring 118 into the position shown. When, however, the left end of the cylinder is pressurized through conduit 116, the piston will be forced to the right until the end 120 of its piston rod engages the stop 122 which may be adjusted to the right or left by turning the screw 124. Thus, when the left end of the cylinder 62 is pressurized through conduit 116, the piston will move to the right until it strikes the stop 122, at which point the cylinder can move no further and a back pressure will be created in conduits 116 and 102.

Reverting again to the pump 68, it is connected through conduit 126 to a spool valve 128 which is similar in construction to the valves 78 and 92 already described. The spool valve 128 is normally urged into its central position shown by springs 130 and 132. With the valve in its central position, the conduit 126 will be connected directly to the return conduit 112. That is, the fluid will simply flow through the valve back to the reservoir 74. When, however, the solenoid 134 is energized, the spool of the valve 128 will shift to the right, thereby connecting conduit 126 to conduit 136 and conduit 112 to conduit 138. This will cause the hydraulic motor 66 to rotate the wheels 32, 34 in one direction. On the other hand, when solenoid 140 is energized, the spool of valve 128 will shift to the left whereby conduit 126 will be connected to a conduit 138 while conduit 136 is connected to the return line 112. Consequently, under the conditions just described wherein the solenoid 140 is energized, the hydraulic motor 66 will cause the wheels 32, 34 to rotate in the opposite direction.

Connected between conduit 76 and the return conduit 112 is a first relief valve 142 which will open when the pressure in conduit 76 exceeds a predetermined level. Similarly, a second relief valve 144 is connected between the conduit 126 and the return conduit 112, this relief valve 144 being adapted to open when the pressure in the conduit 126 exceeds a predetermined level.

In the operation of the hydraulic control system of FIG. 3, if it is desired to move the column 40 and grinding wheel outwardly (i.e., to the left as shown in FIG. 2), the solenoid 82 will be energized to connect conduit 76 to conduit 84, thereby forcing the column 40 outwardly. If neither of the solenoids 94 nor 96 is energized at this time, fluid will be discharged from the left end of the cylinder 58 through conduit 85, conduit 80, and valve 92 to conduit 102. Furthermore, if the solenoid 114 is not energized, the liquid will simply be discharged through valve 108 to the return conduit 112. If either of the solenoids 94 or 96 is energized, then the action is the same as that described above with the exception that the boom pressure cylinder may move upwardly or downwardly, depending upon which one of the solenoids 94 or 96 is energized and the relative loads on cylinders 58 and 60. That is, the action is the same as that previously described with the exception that the cylinder 60 is now connected in series with cylinder 58, and one or both of the pistons within the cylinders may move depending upon their relative loadings.

If solenoid 114 is energized, the conduit 102 will be connected to conduit 116, thereby forcing the piston in the metering cylinder 62 to the right as viewed in FIG. 3 until its forward end 120 strikes the stop 122. At this point, (i.e., when end 120 strikes stop 122), no further fluid can flow into the cylinder 62 through conduits 116 and 102, meaning that if valve 78 is shifted to the right or left, for example, the column 40 will advance only in an amount determined by the movement of the piston within the metering cylinder 62. Actually, when the piston within the metering cylinder stops, a back pressure is created in conduits 116 and 102 and 76. This back pressure will cause the relief valve 142 to open, the relief valve serving to maintain a sufficient pressure within the system to maintain the column 40 at a fixed position. Upon deenergization of the solenoid 114, the spool in valve 108 will move back into the position shown whereby the fluid on both sides of the metering cylinder 62 is discharged to the reservoir 74 such that the spring 118 will return the piston of the metering cylinder back to its original position. It can be seen that in this way the column 40 can be caused to move outwardly over the slab in increments, the length of each increment being determined by the position of the stop 122 associated with the metering cylinder 62.

With reference, now, to the electrical control system for the hydraulic system already described, it includes two terminals 148 and 150 for connection to a source of either alternating or direct current voltage. If it is desired to control the grinder manually, the manual switch 152 will be closed, thereby connecting lead 154 to the input terminal 148. In the manual control system are six switches identified as M–1, M–2, M–3, M–4, M–5 and M–6. With the manual switch 152 closed, closure of switch M–1 energizes solenoid 82, thereby causing the column 40 to be advanced outwardly toward the slab. Similarly, closure of switch M–2 will energize solenoid 86 to cause the column 40 to be retracted. Closure of switch M–3 will energize the solenoid 96 to cause the piston within the boom pressure cylinder 60 to move in one direction; whereas closure of switch M–4 will cause solenoid 94 to become energized to reverse direction of movement of the boom pressure cylinder. Finally, closure of switches M–5 and M–6 will energize solenoids 140 and 134, respectively, to cause the hydraulic motor 66 to move the carriage 19 backwardly or forwardly on the tracks 14 and 16 as the case may be.

In the manual operation of a grinder such as that shown in FIGS. 1 and 2, the operator will manually manipulate the switches M–1 to M–6 to cause the carriage 19 to move backwardly and forwardly parallel to the long transverse dimension of the slab while at the same time causing the grinding wheel 44 to move inwardly or outwardly parallel to the short transverse dimension of the slab. It can readily be appreciated that in this process the entire surface of the slab may be ground under the manual control of the operator. Usually, the operator will position the grinding wheel over one long transverse edge of the slab 10 and then cause the carriage 19 to traverse the tracks 14 and 16, the operator periodically advancing the column 40 and the grinding wheel 44 carried thereby until the entire surface of the slab is ground.

As was mentioned above, the present invention is concerned with means for automatically controlling the grinding apparatus whereby it will grind the entire surface area of the slab without the necessity for manual control by the operator. In the particular embodiment of the invention shown herein, two limit switches LS–1 and LS–2 (FIG. 1) are provided along the track 16. These limit switches are adjustable in position and are arranged such that limit switch LS–1, for example, will be tripped when the grinding wheel reaches one edge of the slab 10 while the limit switch LS–2 is tripped when the grinding wheel reaches the opposite edge. With reference to FIG. 2, it will be noted that two limit switches LS–3 and LS–4 are provided on carriage 19 and are adapted to be engaged by a projection 156 on the carriage 46 which carries motor 50 and reciprocates backwardly and forwardly with the grinding wheel 44. The limit switches LS–3 and LS–4 are also adjustable in position and are arranged such that limit switch LS–4, for example, will be tripped when the grinding wheel reaches the long transverse edge of the slab nearest the carriage 19; whereas the limit switch LS–3 will be tripped when the grinding wheel extends out over the other long transverse edge of the slab.

In order to set up the system for automatic operation, the manual switch 152 is first closed and the grinding wheel manually controlled to move it to the lower left corner of the slab, identified by the reference numeral 180 in FIG. 1. Thereafter, the limit switches LS–1, LS–2, LS–3 and LS–4 are adjusted for the proper dimensions of the slab. That is, the limit switches LS–1 and LS–2 are spaced apart in an amount equal to the long transverse dimension of the slab 10 with the limit switch LS–2 being contacted by the carriage 19 as it will now be at its extreme leftward limit of travel with the grinding wheel position over corner 180. In a somewhat similar manner, the limit switches LS–3 and LS–4 will be spaced apart in an amount equal to the short transverse dimension of the slab with the limit switch LS–3 contacting the projection 156 on the cariage 46 since the grinding wheel is now in its extreme forward position over the corner 180.

After the grinding apparatus has thus been manually controlled to position the grinding wheel over the corner 180 and the limit switches LS–1 to LS–4 have been placed, the manual switch 152 will be opened while the double pole automatic switch 160 will be closed. When switch 160 is closed, the input terminal 148 is connected to lead 162 as well as one lead 164. With switch 160 closed and contacts 191 of limit switch LS–3 closed, a circuit is completed through contacts 171 on relay S, which is not now energized, and lead 252 to solenoid 96, thereby actuating valve 92 to pressurize one side of boom pressure cylinder 60 and lift the grinding wheel off of the slab 10.

In order to start the automatic cycle of operation, the start push button 166 is depressed, thereby energizing the relay S. When relay S is energized, normally open contacts 168, 170, 172, 174 and 176 close. Closure of contacts 174 energizes lead 181 which, in turn, actuates the motor control circuit 72 to start motor 70, thereby causing the hydraulic pumps 64 and 68 to pressurize the conduits 76 and 126. Closure of contacts 176 energizes lead 182 which, in turn, actuates motor control circuit 184 to start the drive motor 50 on platform 46 to rotate the grinding wheel 44. Thus, as soon as the start push button 166 is depressed, the pumps 64 and 68 are started as is the motor 50 which rotates the grinding wheel 44. The relay S is held energized after the start push button 166 is released by virtue of the fact that contacts 168 on relay S are now closed, as are the normally closed contacts 186 on relay A.

[When relay S is energized, it also closes contacts 172 which are adapted to energize relay F.] *With the grinding wheel positioned over the corner 180, limit switch LS–2 is actuated to close its contact 208 to prepare relay F for energization.* Relay F, however, cannot be energized at this time, since the other side of its coil is connected to lead 173, this lead being adapted to be connected through normally open contacts 175 on relay A to the terminal 150. Since relay A is not now energized, the contacts 175 are open and the lead 173 is deenergized. Finally, energization of relay S opens its normally closed contacts 171 to deenergize solenoid 96 and return valve 92 to its normal or center position.

After the start push button 166 is released, its contacts 192 close; and since relay S is now energized and its contacts 170 closed, a circuit is completed through contacts 192, contacts 170, contacts 194 of relay A which is now deenergized, and lead 196 to the solenoid 86, thereby energizing this solenoid to move the spool valve 78 to the left as viewed in FIG. 3. This action connects the pressurized conduit 76 to conduit 85, thereby causing the column 40 and the grinding wheel 44 carried thereby to move toward the tracks 14 and 16 as viewed in FIG. 1 along the left short transverse edge of the slab 10.

The foregoing action (i.e., movement of the grinding wheel inwardly along the left short transverse edge) will continue until the limit switch LS–4 is contacted, thereby closing its contacts 198. When contacts 198 close, a circuit is completed through contacts 189 on limit switch LS–3, which are now closed, and contacts 198 to energize relay A. Energization of relay A, in turn, opens contacts 194 to deenergize the solenoid 86 on valve 78 whereby the grinding wheel will be positioned substantially at point 200 on the slab 10 (i.e., the upper left-hand corner thereof as viewed in FIG. 1). When relay A is thus energized, its contacts 175 close to energize lead 173, the relay A being held energized through contacts 190.

*The energization of relay A opens its contacts 186, thereby causing the deenergization of relay S and the attendant opening of its contacts 168, 170, 172, 174 and 176, while simultaneously closing its contacts 171. However motor 50 and motor 70 continue to operate since a circuit is now completed from power terminal 148 through the lower contacts of switch 160 to lead 162 through contacts 246 of stop button 188, through contacts 248 of relay A (which is now energized), through the upper contacts of switch 160 to lead 154, and thence to leads 183 and 181 connected to operate motors 50 and 70 respectively.*

When relay A is energized, it also closes contacts 202, thereby completing a circuit through these contacts, normally closed contacts 204 on relay X which is now deenergized, and lead 206 to solenoid 94. This causes the spool of valve 92 to move to the right as viewed in FIG. 3 whereby one side of the boom pressure cylinder 60 will be pressurized to move the grinding wheel, which was previously raised at point 180 (FIG. 1) down into engagement with the surface of slab 10.

With contacts 175 closed and lead 173 energized, the relay F will be energized through contacts 208 on limit switch LS–2, these contacts being closed at this time since the limit switch LS–2 now contacts the projection 156 on platform 46 (FIG. 2). When relay F is energized, it will be maintained energized by closure of its contacts 210, these contacts being connected through normally closed contacts 212 on relay R, which is now deenergized, to lead 162. Energization of relay F also opens contacts 214 and closes contacts 216. When contacts 216 are closed, a circuit is completed from lead 162 through the contacts 216 and lead 218 to solenoid 140, thereby shifting the spool for valve 128 to the left and causing the hydraulic motor 66 to rotate the wheels 32, 34 such that the carriage 19 will move to the right as viewed in FIG. 1 (i.e., away from limit switch LS–2). Thus, as soon as the grinding wheel reaches point 200, it will automatically move along the forward long transverse edge of the slab 10 and along the path of the dotted line until it reaches point 220. At this point, the limit switch LS–1 will be engaged, thereby closing its contacts 222 (FIG. 3) to energize relay R which has the other side of its coil connected to the energized lead 173. When relay R is energized, it opens contacts 212, thereby breaking the holding circuit for relay F through contacts 210. After relay R is energized upon closure of contacts 222, it is held energized by closure of its contacts 226, the holding circuit being through contacts 226 and contacts 214 of relay F which are now closed since relay F became deenergized upon opening of contacts 212. When relay R is energized, its contacts 228 also close to energize lead 230, this lead being connected to solenoid 134 on valve 128 to shift the spool of the valve to the right and thereby reverse the hydraulic motor 66 and the direction of rotation of wheels 32, 34. Consequently, the carriage 19 will now reverse and move on the tracks 14 and 16 in a direction from limit switch LS–1 to limit switch LS–2.

Before the carriage 19 moves away from switch LS–1, however, energization of relay R closes contacts 232 to energize relay P, this relay being held energized by closure of its normally open contacts 234. With relay P energized, its contacts 236 close, and since contacts 235 on switch LS–1 are now closed with carriage 19 in its extreme right-hand position, the relay X will be energized through contacts 235 and 236 and switch 237. Relay X, in turn, closes its contacts 238 to energize lead 240, this lead being connected to the solenoid 114 to shift the spool of valve 108 to the right as viewed in FIG. 3 against the force of spring 110. The conduit 102 is now connected through conduit 116 to the left end of the metering cylinder 62 to cause its piston to move against the force of spring 118 to the right until end 120 engages the stop 122.

When relay X was energized, it also closed its contacts 242 thereby energizing lead 245 which is connected to solenoid 82, thereby shifting the spool of valve 78 to the right as viewed in FIG. 3. This connects the pressurized conduit 76 to conduit 84 to move the column 40 and the grinding wheel 44 outwardly (i.e., right to left as viewed in FIG. 2). The amount of movement of the grinding wheel, however, is controlled by the amount of fluid which can pass into the cylinder 58. This, in turn, is controlled by the distance which the piston in the metering cylinder 62 can travel. Thus, the incremental travel of the grinding wheel at the completion of each long transverse stroke is controlled by the position of stop 122.

Relays X and R are now energized with the result that the grinding wheel is advanced along the short transverse dimension of the slab by a short increment while the wheels 32, 34 are driven to traverse the carriage 19 to the right, as viewed in FIG. 1. As soon as the carriage leaves switch LS–1, its contacts 235 open to deenergize relay X, however, relay R will remain energized. This will cause the grinding wheel, advanced through one increment, to travel to the left in FIG. 1 until the limit switch LS–2 is contacted, whereupon the relay F will be energized to reverse the direction of movement of carriage 19 on tracks 14 and 16. When limit switch LS–2 is actuated at the completion of the second stroke, it closes its contacts 244 to again energize the relay X and advance the grinding wheel along the short transverse dimension of the slab through an increment determined by the position of stop 122 on cylinder 62. That is, contacts 236 are closed at this time by virtue of the holding circuit for relay P through contacts 234 so that a circuit is again completed to relay X which energizes to close contacts 242 and energize solenoid 82.

The foregoing action will continue with the carriage traveling back and forth on tracks 14 and 16 and the grinding wheel 44 being advanced in increments at one or both ends of the slab, depending upon whether or not switch 237 is closed. That is, if switch 237 is open, limit switch LS–1 cannot energize relay X to thereby energize solenoid 82, and the grinding wheel will be advanced only when limit switch LS–2 is contacted.

If it is desired to stop the grinding wheel at any point during its traverse of the slab, the stop push button 188 will be depressed, thereby opening contacts 246. Relay A will now become deenergized to open contacts 175 and deenergize lead 173 together with either relay F or relay R, depending upon which direction the carriage 19 is traveling. At the same time, the depression of stop push button 188 closes contacts 250, and since contacts 171 on relay S are now closed, the lead 252 is energized to energize solenoid 96 and shift the spool valve 92 to the left as viewed in FIG. 3 thereby raising the grinding wheel off of the slab 10. To again start the grinder, the start push botton 166 is depressed, thereby closing its contacts 201; and since switch LS–3 is now contacted and its contacts 189 are closed, the relay A will immediately energize and the cycle will progress in the manner described above, *the direction of travel of the grinding wheel being dependent on the condition of limit switches LS–1 and LS–2. If neither LS–1 nor LS–2 is energized, depressing start button 166 will energize relay S as long as the start button 166 is depressed. Thus relay F will be energized through contacts 224 of limit switch LS–1 through contacts 172 of relay S and through contacts 175 of relay A which is also energized. Consequently, the grinding wheel will traverse the slab 10 from left to right as viewed in FIG. 1. The same action will occur if limit switch LS–2 is actuated by energizing relay F through contacts 208 of limit switch LS–2. On the other hand, if limit switch LS–1 is actuated (indicating a grinding wheel position at the right-hand edge of the slab as viewed in FIG. 1) depressing the start button 166 momentarily will cause relay R to be energized through contacts 222 of limit switch LS–1, to cause the grinding wheel to traverse the slab 10 from right to left as viewed in FIG. 1. Thus it can be seen that whatever the position of the grinding wheel with respect to the slab 10, upon the start of automatic operation by depressing start button 166, the system will immediately commence operation in the proper direction.* At any time during automatic operation, the boom may be moved inwardly or outwardly and/or the grinding wheel lifted off of the slab by virtue of the fact that lead 154 connected to switches M–1 to M–4 is connected through switch 160, contacts 248 on relay A and contacts 246 on push button switch 188 to the energized lead 162.

When the slab has been completely scanned in the manner described above and reaches the lower long transverse edge as viewed in FIG. 1, the limit switch LS–3 will be contacted, thereby breaking the circuit to relay A and its contacts 250 energizing lead 252 to energize solenoid 96 and raise the grinding wheel 44. At this point, the slab has been completely ground automatically, whereupon the slab may be turned on the table 12 or a new slab placed on the table preparatory to a succeeding cycle of operation.

In summary, the cycle of operation is as follows:

(1) Grinding wheel is moved to point 180 on slab 10.

(2) Switch 152 is opened and switch 160 closed.

(3) Start push button 166 is depressed.

(4) Boom raises grinding wheel off of slab and grinding wheel moves to point 200 on slab.

(5) When point 200 is reached, limit switch LS–4 closes, grinding wheel is lowered onto slab, and carirage 19 moves to the right as viewed in FIG. 1.

(6) At point 220, grinding wheel is advanced one increment (if switch 237 is closed) and carriage moves from right to left as viewed in FIG. 1 along the dotted line.

(7) At opposite end of slab, grinding wheel is again advanced one increment along short transverse dimension of slab and carriage 19 reverses.

(8) Back and forth action continues until switch LS–3 is contacted and the cycle completed with the entire surface of the slab ground.

The embodiment of the invention just described requires, of course, that the operator manually position the limit switches LS–1, LS–2, LS–3 and LS–4 for each different slab which is surfaced. This is due to the difference in dimensions of succesive slabs and the difference in positioning of the slab on the frame members 12. In the usual care, the operator will manually position the grinding wheel over point 220 shown in FIG. 1 and set the limit switches LS–1 and LS–4. Thereafter, he will manually move the grinding wheel to point 180 and set the limit switches LS–2 and LS–3. At this point the start switch 166 is depressed and the automatic cycle begins. As will be understood, this is a somewhat cumbersome procedure and requires that the operator leave the platform 20 each time the limit switches are set.

A system for eliminating manual positioning of the limit switches by the use of bistable magnetic amplifiers is shown in FIG. 4. The system is essentially the same as that shown in FIG. 3 with the exception that the limit switches LS–1, LS–2 and LS–3 are replaced by relays RS–1, RS–2 and RS–3, respectively. However, the operator no longer needs to position the grinding wheel over points 220 and 180 and manually adjust the limit switches.

Furthermore, this latter system eliminates the need for limit switch LS–4 and its contacts 198. That is, the limit switch LS–4 is replaced by the switch contacts 201 of start switch 166. The contacts 201, it will be noted, are in parallel with the limit switch LS–4 in FIG. 3 and will serve to initially energize the relay A when the grinding wheel is positioned over point 200 for the reason that contacts 198 on relay RS–3, corresponding to limit switch LS–3, will then be closed.

With the circuit of FIG. 4, the automatic cycle of operation begins at point 200. Therefore, it is no longer necessary to automatically move the grinding wheel from point 180 to point 200 as shown in FIG. 1, meaning that the circuit of FIG. 3 including contacts 192, 170 and 194 in parallel with the manual switch M–2 are eliminated. Furthermore, since the grinding cycle now starts from point 200 rather than point 180, the holding circuit for relay S through contacts 168 and 186 can be eliminated since it is no longer necessary to "hold" relay S energized to close contact 170 while the grinding wheel moves from point 180 to point 200. Aside from these changes, however, the circuit functions in the same manner as previously described with the contacts 201 of start switch 166 comprising the "fourth switch" recited in the following claims which is actuated at the inner extreme limit of travel of the grinding wheel defined by the inner edge of the slab 10.

With specific reference to FIG. 4, it will be noted that *the bistable units are connected across a pair of leads designated 151 and 177, which leads are operatively connected through a double pole two-position set switch 159. The set switch 159 is adapted to be actuated between a left-hand or "set" position, and a right-hand or "normal" position. The "set" position would correspond to the desired position for set switch 159 to set up the limits for a given slab size, the right-hand or "normal" position would correspond to the position of the set switch 159 when the system is in automatic operation. In the "normal" position of set switch 159, lead 151 is electrically connected to lead 162 and lead 177 is electrically connected to lead 173, the leads 162 and 173 corresponding to those shown in FIG. 3.*

*During the operation of setting up the limits, manual switch 152 is closed to thereby energize lead 154 and permit operation of the manual switches M–1 through M–6 to permit movement of the carriage* 19 *and the boom 40 as desired to establish the limits for the particular slab size. The set switch 159 is actuated to its left-hand or "set" position, thereby electrically connecting lead 151 to positive power input terminal 148 and electrically connecting lead 177 to the negative input power terminal 150, the terminals 148 and 150 corresponding to those shown in FIG. 3. As can be seen* the relay RS–1 which now replaces limit switch LS–1 is connected through a diode 260–1 to the output winding 262–1 of a bistable magnetic amplifier 264–1. As shown, the bistable amplifier 264–1 comprises a core 266–1 of rectangular hysteresis loop material having the output winding 262–1 thereon as well as two input windings 268–1 and 270–1. The input winding 268–1 is connected across leads [162] *151* and [173] *177* [corresponding to those shown in FIG. 3]. The other input winding 270–1 is connected between the movable tap of a manually adjustable rheostat 272–1 and the movable tap of a potentiometer 34–P. The rheostat 272–1 is located at the operator's control console 24 shown in FIGS. 1 and 2 and is provided with a rotatable knob or the like whereby the operator may manually position its movable tap. The potentiometer 34–P, on the other hand, is connected through a mechanical linkage 274 to one of the wheels 34 on which the carriage 19 moves. The mechanical linkage 274 may incorporate gear reducing means such that the tap on potentiometer 34–P will move throughout its range only when the wheel 34 has rotated through a number of revolutions sufficient to traverse the carriage 19 along its full path of travel on tracks 14 and 16.

It will be readily appreciated that the rheostat 272–1 and the potentiometer 34–P comprise a bridge circuit arrangement which is energized from leads [162] *151* and [173] *177*, the output of the bridge circuit appearing across the input winding 270–1. Normally, the voltage across the input winding 268–1, as determined by the variable resistor 274–1, will be such as to induce flux in the core 266–1 just beneath its saturation level. Therefore, with no voltage applied across the winding 270–1, and assuming that an alternating current voltage is applied to input leads [162] *151* and [173] *177*, a voltage will be induced across the secondary or output winding 262–1 to energize relay RS–1 and thereby reverse the positions of contacts 222, 224 and 235 shown in FIG. 4. When, however, a voltage is applied to winding 270–1, the core 266–1 will abruptly saturate whereby no voltage will be induced in the output winding 262–1 and the relay RS–1 will remain deenergized with the contacts 222, 224 and 235 in the positions shown.

No voltage will be induced across the winding 270–1 only when the bridge circuit comprising rheostat 272–1 and potentiometer 34–P is balanced. By adjusting the rheostat 272–1 such that the bridge circuit will be balanced when the grinding wheel reaches the right edge of the slab as shown in FIG. 1, the relay RS–1 will become energized when the right edge of the slab is reached to close contacts 222 and 235 and open contacts 224 in the same manner as limit switch LS–1 shown in FIG. 3.

In order to establish the conditions in the bridge circuit whereby the relay RS–1 will become energized at the right edge of slab 10, the grinding wheel is manually guided, for example, to point 220 shown in FIG. 1. When the bridge is not balanced and relay RS–1 is deenergized due to saturation of the core 266–1, contacts 276–1 on relay RS–1 will be closed to energize an indicating lamp 278–1 located on the operator's control console 24 in FIGS. 1 and 2. However, by adjusting the rheostat 272–1 to the point where the bridge circuit is balanced with the grinding wheel at point 220, the voltage across winding 270–1 will fall to the point where the core 266–1 becomes unsaturated and the relay RS–1 is energized, thereby opening the contacts 276–1 to extinguish the lamp 278–1. Consequently, by adjusting the rheostat 272–1 and observing the lamp 278–1 until it is extinguished, the operator can determine the point of balance of the bridge for the right edge of the slab as shown in FIG. 1. In actual practice, the operator will usually adjust the rheostat in one direction until the lamp 278–1 is extinguished, whereupon he will reverse the direction of movement of the rheostat to the point exactly where the lamp 278–1 again becomes energized.

The circuit for controlling relay RS–2 corresponding to limit switch LS–2 in FIG. 3 is the same as that for relay RS–1, the potentiometer 34–P also being connected in a bridge circuit arrangement with a second potentiometer 272–2 located at the operator's control console 24. In order to adjust the rheostat 272–2, the operator will manually guide the grinding wheel to point 200, for example, whereupon he will adjust rheostat 272–2 until the lamp 278–2 is extinguished. Thereafter, he will reverse the movement of the rheostat to the point just where the lamp 278–2 is again energized. With this arrangement, it can be sen that as the grinding wheel moves back and forth transversely across the slab, the relay RS–1 will become energized when the right edge of the slab is reached as shown in FIG. 1 to close contacts 222 and 235 while opening contacts 244; and relay RS–2 will become energized when the left edge of the slab is reached to close contacts 208 and 224.

The relay RS–3, corresponding to limit switch LS–3 in FIG. 3 is controlled by a circuit similar to that for relays RS–1 and RS–2. In this case, however, the bridge circuit includes a rheostat 272–3 together with a potentiometer 58–P having its movable tap connected through a mechanical linkage 280 to the boom 40 of cylinder 58, the mechanical linkage 280 being such that as the boom moves outwardly, the movable tap on potentiometer 58–P will be caused to move across its stationary resistance element. Again, relay RS–3 will become energized to close contacts 191 and open contacts 189 only when the bridge circuit comprising elements 272–3 and 58–P is balanced. This, of course, should occur when the grinding wheel reaches the outer edge of the slab furthest removed from carriage 19. Accordingly, the grinding wheel is initially positioned at the outer edge by the operator and the rheostat 272–3 adjusted until relay RS–3 becomes energized to open contacts 276–3, whereupon the lamp 278–3 is extinguished. Thereafter, the rheostat is adjusted backwardly just to the point where the lamp 278–3 is again energized. During the grinding operation, relay RS–3 will not become energized in the automatic cycle of operation until the outer edge of the slab is reached, the operation being the same as that of FIG. 3 where limit switch LS–3 is energized at the completion of the grinding operation.

The operation of the embodiment of the invention just described may be summarized as follows:

(1) After the slab is placed on the frame members 12, the operator *closes switch 152, actuates switch 159 to its "set" position*, manually controls the equipment to move the grinding wheel to the right edge of the slab shown in FIG. 1 and adjusts rheostat 272–1 until lamp 278–1 is extinguished. He thereafter reverses the rheostat until the lamp 278–1 is energized.

(2) The operator manually controls the equipment to move the grinding wheel to the left edge of the slab as shown in FIG. 1 and adjusts the rheostat 272–2, using the indicating lamp 278–2 to obtain the null condition.

(3) Thereafter, the operator manually controls the boom 40 to move the grinding wheel to the edge of the slab furthest removed from carriage 19 and adjusts the rheostat 272–3 using the indicating lamp 278–3 to obtain a null in the manner described above.

(4) Following adjustment of rheostats 272–1, 272–2 and 272–3, the operator manually controls the machine to move the grinding wheel to point 200 shown in FIG. 1. Thereafter, switch 152 is opened, *switch 159 is actuated to its "normal" position* and the switch 160 is closed. Finally, start push button 166 is depressed whereupon the automatic cycle of operation is initiated.

It will be appreciated that in both embodiments of the invention, a switch must be actuated at each edge of the slab in order to control the automatic cycle of operation. In the case of the embodiment of FIG. 3, the four switches comprise the limit switches LS–1, LS–2, LS–3 and LS–4; whereas in the embodiment shown in FIG. 4 the switches comprise relays RS–1, RS–2 and RS–3 together with the start push button switch 166.

Although the invention has been shown in connection with certain specific embodiments, it will be readily apparent to those skilled in the art that various changes in form and arrangement of parts may be made to suit requirements without departing from the spirit and scope of the invention.

We claim:

1. In workpiece surfacing apparatus having a surfacing tool, supporting means for supporting a generally rectangular workpiece to be surfaced, first motor means for producing relative reciprocating movement between the tool and the supporting means in a first direction, and second motor means for producing relative movement between the tool and the supporting means in a second direction which is transverse to said first direction; the improvement which comprises first and second switch devices which are actuated at the limits of relative reciprocating movement between the tool and the supporting means in said first direction, a third switch device which is actuated at one limit of relative movement between the tool and the supporting means in said second direction, a fourth switch device which is actuated at the other limit of relative movement between the tool and the supporting means in said second direction, the limits of relative movement of the tool and the supporting means in said first and second directions being at the edges of said workpiece, circuit means including said first and second switch devices for causing the first motor means to reverse the direction of relative movement along said first direction whenever a limit of travel is reached while causing said second motor means to produce relative movement between the tool and the supporting means in increments along said second direction whenever at least one of the first and second switch devices is actuated, apparatus included in said circuit means for initiating operation of said first motor means when the fourth switch device is actuated, and apparatus included in said circuit means for stopping said first and second motor means when the third switch device is actuated.

2. In workpiece surfacing apparatus having stationary supporting means for supporting a workpiece to be surfaced, a first carriage movable along a path adjacent one long transverse edge of said workpiece, a second carriage on the first carriage and adapted for relative movement with respect to the first carriage along a path which is transverse to the path of travel of the first carriage and along the short transverse dimension of the workpiece, and a surfacing tool on the second carriage adapted to engage a workpiece on said stationary supporting means; the improvement of first motor means for producing reciprocating movement of said first carriage along its path of travel, second motor means for producing reciprocating movement of the second carriage and the tool carried thereby along its transverse path of travel, a first pair of switch devices which are actuated at the extreme limits of reciprocating movement of the first carriage, a second pair of switch devices which are actuated at the extreme limits of reciprocating movement of the second carriage, the extreme limits of reciprocating movement of the first carriage being at the edges of the workpiece along the path of travel of the first carriage and the extreme limits of reciprocating movement of the second carriage being at the edges of the workpiece along the transverse path of travel of the second carriage, circuit means including one of said second pair of switch devices for causing the first motor means to initially advance the first carriage along its path of travel, apparatus in said circuit means including said first pair of switch devices for causing the first motor means to reverse the direction of movement of said first carriage whenever an extreme limit of travel is reached while causing the second motor means to advance said second carriage and the tool carried thereby in increments away from the first carriage whenever at least one of the first pair of switch devices is actuated, and means including the other of said second pair of switch devices for stopping movement of said first and second carriages when an extreme limit of travel of the second carriage is reached.

[3. In workpiece surfacing apparatus having stationary supporting means for supporting a workpiece to be surfaced, a first carriage movable along a path adjacent said supporting means, a second carriage on the first carriage and adapted for relative movement with respect to the first carriage along a path which is transverse to the path of travel of the first carriage, and a surfacing tool on the second carriage adapted to engage a workpiece on said stationary supporting means; the improvement of first and second switch devices adapted to be actuated at the extreme limits of reciprocating movement of the first carriage, a third switch device adapted to be actuated at the extreme limit of movement of the second carriage away from the first carriage, a fourth switch device adapted to be actuated at the extreme limit of movement of the second carriage toward the first carriage, means including the third switch device for causing the surfacing apparatus to initiate an automatic cycle of operation, and means including said first, second, third and fourth switch devices for controlling said automatic cycle of operation.]

[4. In workpiece surfacing apparatus having stationary supporting means for supporting a workpiece to be surfaced, a first carriage movable along a path adjacent said supporting means, a second carriage on the first carriage and adapted for relative movement with respect to the first carriage along a path which is transverse to the path of travel of the first carriage, and a surfacing tool on the second carriage adapted to engage a workpiece on said stationary supporting means; the improvement of first motor means for producing reciprocating movement of said first carriage along its path of travel, second motor means for producing reciprocating movement of the second carriage and the tool thereby carried along its transverse path of travel, first and second switch devices adapted to be actuated at the extreme limits of reciprocating movement of the first carriage, a third switch device adapted to be actuated at the extreme limit of movement of the second carriage away from the first carriage, a fourth switch device adapted to be actuated at the extreme limit of movement of the second carriage toward the first carriage, circuit means including said third switch device for causing the second motor means to move the second carriage toward the first carriage, circuit means including said first and fourth switch devices for causing said first motor means to move the first carriage along its path of travel from one extreme limit of movement to the other, circuit means including said first and second switch devices for causing the first carriage to reciprocate back and forth along its path of travel between its extreme limits of travel, and circuit means including at least one of said first and second switch devices for actuating the second motor means to advance the second carriage away from the first carriage in an incremental amount whenever said one of the first and second switch devices is actuated.]

[5. The improvement of claim 4 including means for actuating the second motor means to advance the second carriage in increments when each of said first and second switch devices is actuated.]

6. In workpiece surfacing apparatus having a surfacing tool, supporting means for supporting a workpiece to be surfaced, first motor means for producing relative reciprocating movement between the tool and the supporting means in a first direction, second motor means for producing relative movement between the tool and the supporting means in a second direction which is transverse to said first direction, and third motor means for elevating or lowering the surfacing tool with respect to a workpiece on said supporting means; the improvement which comprises first and second switch devices which are actuated at the extreme limits of relative reciprocating movement between the tool and the supporting means in said first direction, third and fourth switch devices which are actuated at the extreme limits of relative movement between the tool and the supporting means in said second direction, said extreme limits of relative movement being at the edges of said workpiece, circuit means including said first and second switch devices for causing the first motor means to reverse the direction of relative movement along said first direction whenever an extreme limit of travel is reached while causing said second motor means to produce relative movement between the tool and the supporting means in increments along said second direction whenever at least one of the first and second switch devices is actuated, circuit means including one of said third and fourth switch devices for causing the third motor means to elevate the surfacing tool off of a workpiece on said supporting means, circuit means including the other of said third and fourth switch devices for causing the third motor means to lower the surfacing tool onto a workpiece carried on said supporting means, and circuit means including said one of the third and fourth switch devices for stopping said first and second motor means after a workpiece has been surfaced.

7. In workpiece surfacing apparatus having stationary supporting means for supporting a workpiece to be surfaced, a first carriage movable along a path adjacent said supporting means, a second carriage on the first carriage and adapted for relative movement with respect to the first carriage along a path which is transverse to the path of travel of the first carriage, and a surfacing tool on the second carriage adapted to engage a workpiece on said stationary supporting means; the improvement of first motor means for producing reciprocating movement of said first carriage along its path of travel, second motor means for producing reciprocating movement of the second carriage and the tool carried thereby along their transverse path of travel, third motor means for elevating or lowering said surfacing tool with respect to a workpiece positioned on said supporting means, first and second switch devices adapted to be actuated at the extreme limits of reciprocating movement of the first carriage, a third switch device adapted to be actuated at the extreme limit of movement of the second carriage away from the first carriage, a fourth switch device adapted to be actuated at the extreme limit of movement of the second carriage toward the first carriage, circuit means including said third switch device for causing the third motor means to elevate the surfacing tool off of the workpiece and for causing the second motor means to move the second carriage toward the first carriage, circuit means including said first and fourth switch devices for causing said third motor means to lower the surfacing tool into contact with said workpiece and for causing said first motor means to move the first carriage along its path of travel from one extreme limit of movement to the other, circuit means including said first and second switch devices for causing the first carriage to reciprocate back and forth along its path of travel between its extreme limits of travel, and circuit means including at least one of said first and second switch devices for actuating the second motor means to advance the second carriage away from the first carriage in an incremental amount whenever at least said one of the first and second switch devices is actuated.

8. The improvement of claim 7 and including circuit means responsive to actuation of the third switch device upon movement of the surfacing tool away from the first carriage for causing said third motor means to elevate the surfacing tool off of the workpiece at the completion of a surfacing operation.

9. In workpiece surfacing apparatus having stationary supporting means for supporting a workpiece to be surfaced, a first carriage movable along a path adjacent said supporting means, a second carriage on the first carriage and adapted for relative movement with respect to the first carriage along a path which is transverse to the path of travel of the first carriage, a surfacing tool on the second carriage adapted to engage a workpiece on said stationary supporting means, and motor means for elevating or lowering said surfacing tool with respect to a workpiece carried on said supporting means; the improvement of first and second switch devices which are actuated at the extreme limits of reciprocating movement of the first carriage, a third switch device which is actuated at the extreme limit of movement of the second carriage away from the first carriage, a fourth switch device which is actuated at the extreme limit of movement of the second carriage toward the first carriage, said limits of movement being at the edges of said workpiece, means including said first, second, third and fourth switch devices for controlling an automatic cycle of operation of said surfacing apparatus, means including said third switch device for causing said motor means to elevate the surfacing tool off of said workpiece, and means including said fourth switch device for causing the motor means to lower the surfacing tool onto said workpiece.

10. In workpiece surfacing apparatus having a surfacing tool, supporting means for supporting a workpiece to be surfaced, first motor means for producing relative reciprocating movement between the tool and the supporting means in a first direction, and second motor means for producing relative movement between the tool and the supporting means in a second direction which is transverse to said first direction; the improvement which comprises switch devices which are actuated at the extreme limits of relative reciprocating movement between the tool and the supporting means in said first direction, said limits of relative reciprocating movement being at the edges of said workpiece along said first direction, each of said switch devices including a bridge circuit arrangement having first and second potentiometer devices in its opposite legs and arranged to actuate the switch device when the bridge circuit arrangement is balanced, each of said potentiometer devices being provided with a movable tap, one of said taps being manually adjustable and the other being operatively connected to said first motor means such that the tool may be positioned at an edge of the workpiece along said first direction and the manually adjustable tap moved to a position where the bridge circuit arrangement is balanced, and circuit means including said switch devices for causing the first motor means to reverse the direction of movement along said first direction whenever an extreme limit of travel is reached while causing said second motor means to produce relative movement between the tool and the supporting means in increments along said second direction whenever at least one of the switch devices is actuated.

11. In workpiece surfacing apparatus having a surfacing tool, supporting means for supporting a workpiece to be surfaced, first motor means for producing relative reciprocating movement between the tool and the supporting means in a first direction, and second motor means for producing relative movement between the tool and the supporting means in a second direction which is transverse to said first direction; the improvement which comprises switch devices adapted to be actuated at the limits of relative reciprocating movement between the tool and the supporting means in said first direction, said limits of relative reciprocating movement being at the edges of said workpiece along said first direction, each of said switch devices including a bridge circuit arranged to actuate the switch device when the bridge circuit is balanced, said bridge circuit in each of the switch devices including a potentiometer having a movable tap operatively connected to said first motor means such that the bridge circuit will be balanced to actuate the switch device when the tool is at an associated one of the edges of said workpiece, and circuit means including said switch devices for causing the first motor means to reverse the direction of movement along said first direction whenever an extreme limit of travel is reached while causing said second motor means to produce relative movement between the tool and the supporting means in increments along said second direction whenever at least one of the switch devices is actuated.

12. In workpiece surfacing apparatus having a surfacing tool, supporting means for supporting a workpiece to be surfaced, first motor means for producing relative reciprocating movement between the tool and the supporting means in a first direction, and second motor means for producing relative movement between the tool and the supporting means in a second direction which is transverse to said first direction; the improvement which comprises first and second switch devices which are actuated at the limits of relative reciprocating movement between the tool and the supporting means in said first direction, said limits of relative reciprocating movement being at the edges of the workpiece along said first direction, each of said first and second switch devices including a bridge circuit arrangement having first and second potentiometer devices each provided with a movable tap and arranged to actuate the switch device when the bridge circuit arrangement is balanced, one of said taps being manually adjustable and the other being operatively connected to said first motor means such that the tool may be positioned over an associated one of said edges and said one tap manually adjusted to balance the bridge circuit whereby the switch device will be actuated at that edge, a third switch device which is actuated at one limit of relative movement between the tool and the supporting means in said second direction, said third switch device also including a bridge circuit arrangement having first and second potentiometer devices each provided with a movable tap and arranged to actuate the switch device when the bridge circuit arrangement is balanced, one of the taps of said latter-mentioned switch device also being manually adjustable and the other being operatively connected to said second motor means such that the tool may be positioned at the edge of the workpiece along said second direction and the last-mentioned manually adjustable tap positioned to balance the bridge circuit arrangement whereby the third switch device will be actuated at said edge, circuit means including said first and second switch devices for causing the first motor means to reverse the direction of relative movement along said first direction whenever a limit of travel is reached while causing said second motor means to produce relative movement between the tool and the supporting means in increments along said second direction whenever at least one of the first and second switch devices is actuated, and apparatus included in said circuit means for stopping said first and second motor means when the third switch device is actuated.

13. The improvement of claim 12 and including a fourth switch device included in said circuit means for initiating movement of the first and second motor means.

14. In workpiece surfacing apparatus having stationary supporting means for supporting a workpiece to be surfaced, a first carriage movable along a path adjacent said supporting means, a second carriage on the first carriage and adapted for relative movement with respect to the first carriage along a path which is transverse to the path of travel of the first carriage, a surfacing tool on the second carriage adapted to engage a workpiece on said stationary supporting means, and motor means for elevating or lowering said surfacing tool with respect to a workpiece carried on said supporting means; the improvement of first and second switch devices which are actuated at the extreme limits of relative reciprocating movement of the first carriage, a third switch device which is actuated at the extreme limit of movement of the second carriage away from the first carriage, means including said first and second switch devices for controlling an automatic cycle of operation of said surfacing apparatus, and circuit means including said third switch device for causing said motor means to elevate the surfacing tool off of said workpiece.

References Cited

The following references, cited by the Examiner, are of record in the patented file of the patent or the original patent.

UNITED STATES PATENTS

| | | | |
|---|---|---|---|
| 1,866,212 | 7/1932 | Huxford et al. | 51—92 |
| 2,068,529 | 1/1937 | Bladenhofer | 51—92 |
| 2,671,294 | 3/1954 | Cornell | 51—92 |
| 3,052,067 | 9/1962 | Dilks | 51—35 |
| 3,026,653 | 3/1962 | De Zordo | 51—56 |
| 3,286,409 | 11/1966 | Greenberg | 51—34 |

HAROLD D. WHITEHEAD, *Primary Examiner.*

ROBERT C. RIORDON, *Examiner.*

J. A. MATHEWS, *Assistant Examiner.*